United States Patent
Nguyen

(10) Patent No.: US 8,222,879 B2
(45) Date of Patent: *Jul. 17, 2012

(54) METHOD AND APPARATUS FOR SYNCHRONOUS BUCK WITH ACTIVE NEGATIVE CURRENT MODULATION

(75) Inventor: James H. Nguyen, San Jose, CA (US)

(73) Assignee: Monolithic Power Systems, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/090,082

(22) Filed: Apr. 19, 2011

(65) Prior Publication Data

US 2011/0193543 A1 Aug. 11, 2011

Related U.S. Application Data

(63) Continuation of application No. 12/057,747, filed on Mar. 28, 2008, now Pat. No. 7,928,713.

(51) Int. Cl.
*G05F 1/40* (2006.01)

(52) U.S. Cl. .................................... 323/282; 323/285
(58) Field of Classification Search .......... 323/222–224, 323/282–288, 272–274; 363/53, 84, 95, 363/97, 21.03, 21.04, 21.15, 17, 131, 127
See application file for complete search history.

(56) References Cited

U.S. PATENT DOCUMENTS

| | | | | |
|---|---|---|---|---|
| 6,069,809 | A * | 5/2000 | Inoshita | 363/98 |
| 6,329,801 | B1 * | 12/2001 | Zuniga et al. | 323/285 |
| 6,407,899 | B1 * | 6/2002 | Carpenter | 361/86 |
| 6,888,354 | B1 * | 5/2005 | Gofman | 324/427 |
| 7,746,042 | B2 * | 6/2010 | Williams et al. | 323/223 |

* cited by examiner

*Primary Examiner* — Rajnikant Patel
(74) *Attorney, Agent, or Firm* — Perkins Coie LLP

(57) ABSTRACT

A circuit is disclosed that includes a buck voltage regulator electrically coupled to an active current modulator. The active current modulator is operable to detect a negative current in the low-side switch of the buck voltage regulator circuit during a light mode operation. Whenever the negative current is detected, the active negative current modulator causes the low-side switch to stay ON in a linear mode and limits the negative current to a predetermined current level.

20 Claims, 5 Drawing Sheets

METHOD AND APPARATUS FOR SYNCHRONOUS BUCK WITH ACTIVE NEGATIVE CURRENT MODULATION

CROSS-REFERENCE TO RELATED APPLICATIONS

This application is a continuation of U.S. patent application Ser. No. 12/057,747, filed Mar. 28, 2008 now U.S. Pat. No. 7,928,713 and titled METHOD AND APPARATUS FOR SYNCHRONOUS BUCK WITH ACTIVE NEGATIVE CURRENT MODULATION, which is incorporated herein by reference in its entirety.

TECHNICAL FIELD

The present invention relates generally to the field of analog integrated circuits, and more particularly, the present invention relates to switch-mode voltage regulators.

BACKGROUND

In a conventional switch-mode synchronous buck voltage regulator, under light load or no load conditions, the conduction state of the low-side switch may be long enough for the inductor current ($i_L$) to decay to zero and start to reverse. This reverse inductor current ($I_L$) will generate additional voltage stress across the low-side switch during the transition to and from the dead times because of the voltage drop in the body diode of the high-side transistor switch and the voltage spikes caused by parasitic components. As a result, the higher the negative inductor current, the higher the voltage stress. Thus, it is desirable to prevent excessive voltage stress on the low-side switch by limiting the negative inductor current in a switch-mode synchronous buck voltage regulator.

Furthermore, the turning off of the low-side transistor switch will cause high frequency oscillation at the switch node due to parasitic elements. Usually this oscillation frequency is much higher than the switching frequency. As a result, the output may see high frequency ripples, resulting in electromagnetic interference (EMI) that adversely affects the performance of other components circuit. Passive RC snubbers have been used to suppress the ringing. Although this prior-art method is effective, the RC snubber has reduced power efficiency.

BRIEF DESCRIPTION OF THE DRAWINGS

The accompanying drawings, which are incorporated in and from a part of this specification, illustrate embodiments of the invention and, together with the description serve to explain the principles of the invention.

DETAILED DESCRIPTION

Reference will now be made in detail to different embodiments of the invention, examples of which are illustrated in the accompanying drawings. While the invention will be described in conjunction with different embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Figure 1:
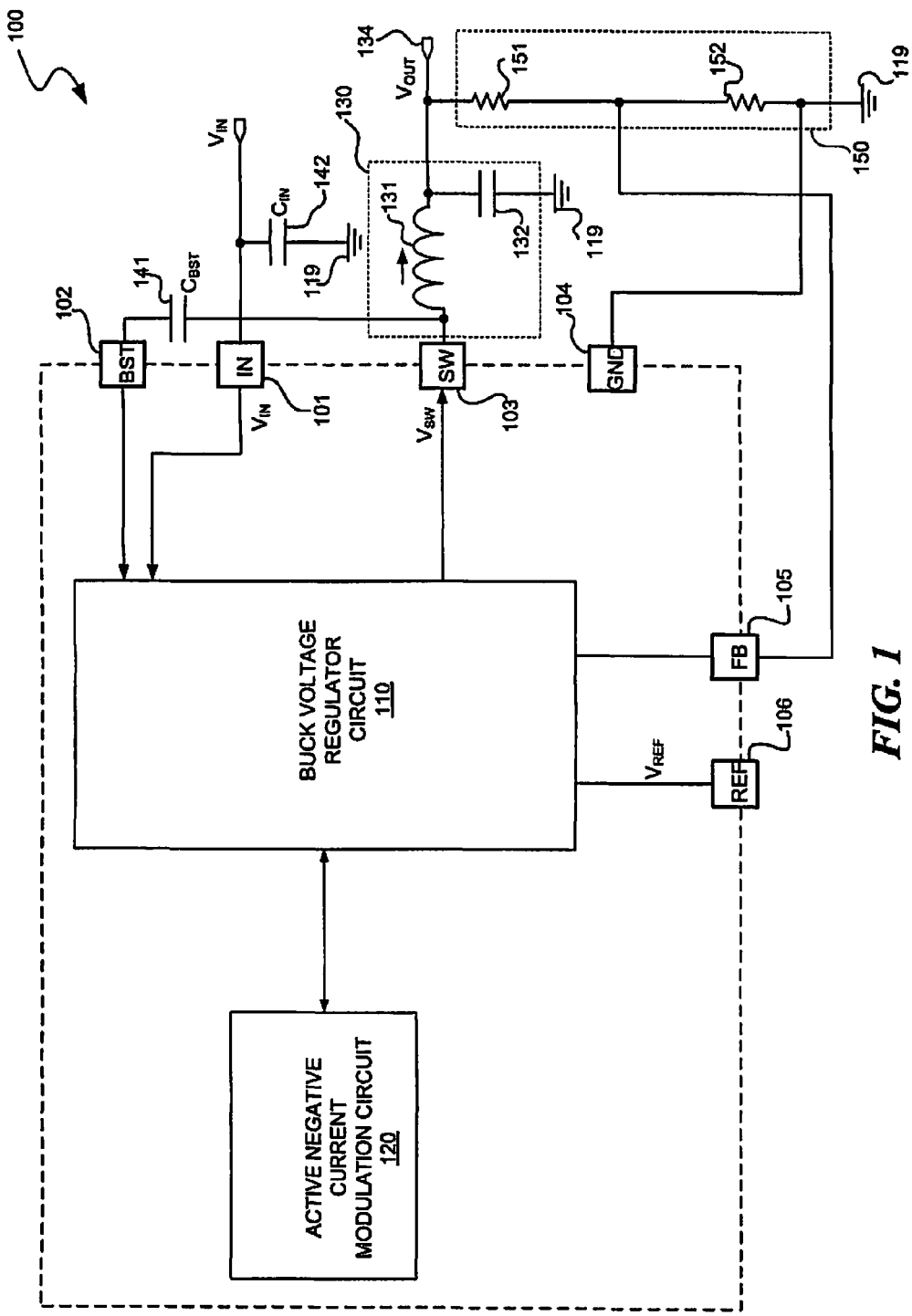
FIG. 1 is a block diagram of a switch-mode buck voltage regulator integrated circuit having an active negative current modulation circuit electrically coupled to a buck voltage regulator circuit in accordance with an embodiment of the present invention.

Referring now to FIG. 1, a block diagram of a switch-mode synchronous buck regulator integrated circuit 100 is shown in accordance with an embodiment of the present invention. Switch-mode synchronous buck voltage regulator integrated circuit 100 includes a buck voltage regulator circuit 110 and an active negative current modulation circuit 120. In one embodiment, switch-mode buck voltage regulator integrated circuit 100 may be in the form of an integrated circuit package (IC) having an input pin (IN) 101, a bootstrap pin (BST) 102, switch node (SW) pin 103, a ground pin (GN) 104, a feedback pin (FB) 105, and a voltage reference (REF) pin 106 where a reference voltage ($V_{REF}$) is applied. In one embodiment, reference voltage ($V_{REF}$) may be set internally inside switch-mode buck voltage regulator integrated circuit 100. Input pin (IN) 101 is where an unregulated input voltage ($V_{IN}$) is applied to buck voltage regulator circuit 110 at input pin (IN) 101. Also, a bootstrap capacitor ($C_{BST}$) 141 is connected between bootstrap pin (BST) 102 and switch-node (SW) pin 103 to supply the correct gate drive voltage for high-side switch inside buck voltage regulator circuit 110. An input capacitor ($C_{IN}$) 142 is connected between input pin (IN) 101 and an electrical ground 119. At an output terminal 134, a sample of output voltage ($V_{OUT}$) is fed back to control switch mode buck voltage regulator circuit 110.

Continuing with FIG. 1, an LC filter 130 is connected to switch-mode buck voltage regulator integrated circuit 200 at switch node (SW) pin 103 to receive a switched voltage from buck voltage regulator circuit 110. In one embodiment, output filter 130 is an LC filter configured by an inductor (L) 131 electrically coupled to a capacitor (C) 132. The first terminal of inductor (L) 131 is electrically coupled to switch node pin (SW) 103. The second terminal of inductor (L) 131 is coupled to capacitor (C) 132 and to output terminal 134 where a regulated output voltage ($V_{OUT}$) is drawn. The other terminal of capacitor (C) 132 is electrically coupled to electrical ground 119. Furthermore, output terminal 134 is electrically coupled to a feedback circuit 150 that further comprises a first resistor 151 coupled to a second resistor 152. More particularly, first terminal of first resistor 151 is electrically coupled to output terminal 134 and the other terminal of first resistor 151 is electrically coupled to second resistor 152 and to feedback pin (FB) 105. The other terminal of second resistor 152 is connected to electrical ground 119. With this arrangement, a sample of regulated output voltage ($V_{OUT}$) is fed back to regulate buck voltage regulator circuit 110.

Still referring to FIG. 1, active negative current modulation circuit 120 (also referred to as an active negative current modulator), is electrically coupled to buck circuit 110 to detect a negative current during a light load operation, to cause a low-side switch to stay on in a linear mode, and to limit the negative current to a predetermined current level.

Figure 2:
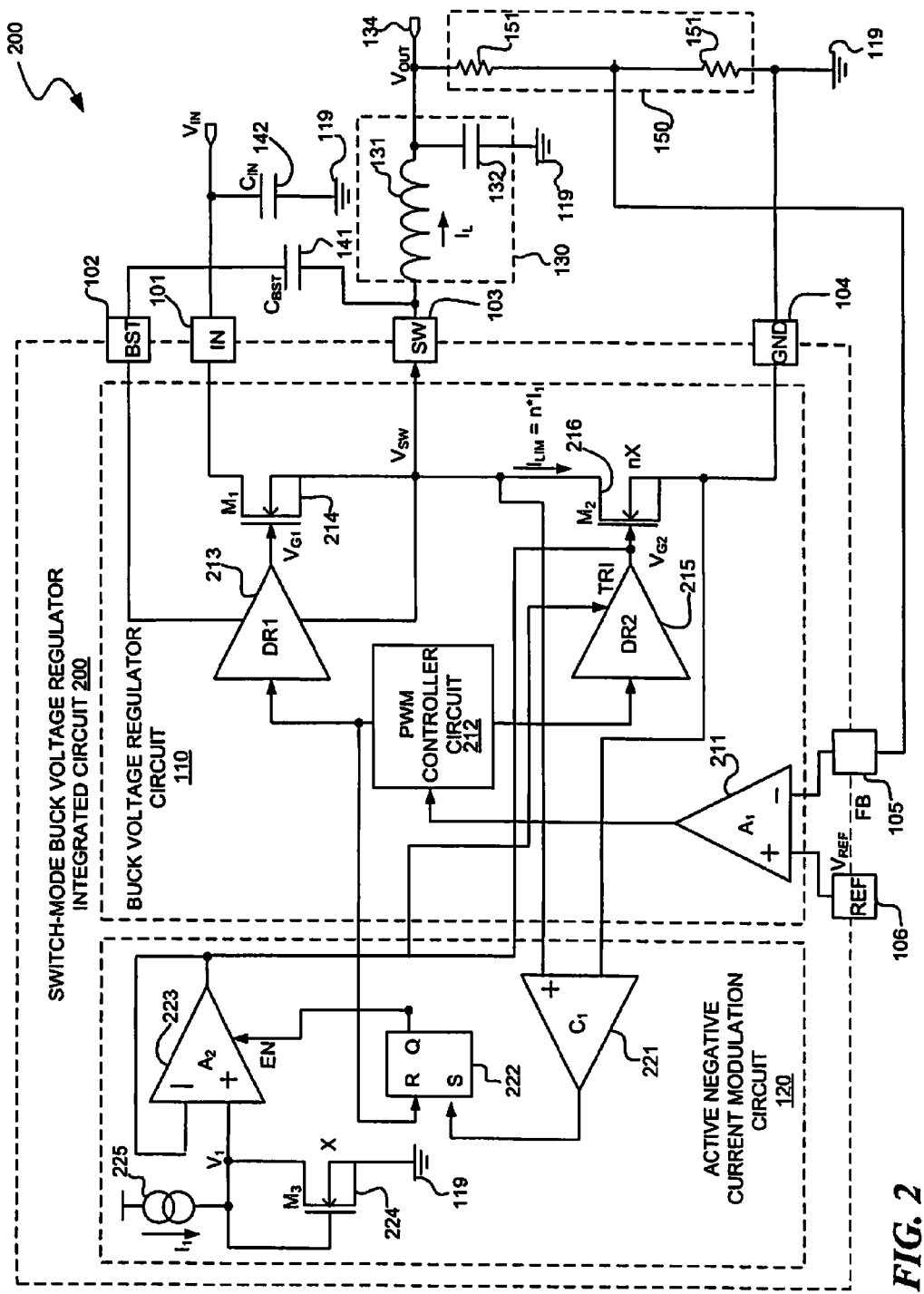
FIG. 2 is a schematic diagram of the switch-mode buck voltage regulator integrated circuit (IC) having an active negative current modulation circuit electrically coupled to a buck voltage regulator circuit in accordance with an embodiment of the present invention.

Turning now to FIG. 2, there is shown an embodiment of a switch-mode synchronous buck voltage regulator integrated circuit 200. In this embodiment, a high-side n-channel Metal Oxide Semiconductor (nMOS) transistor switch 214 (hereinafter referred to as "high-side nMOS transistor switch ($M_1$)") is connected to a low-side n-channel Metal Oxide Semiconductor (nMOS) transistor switch 216 (hereinafter referred to as "low-side nMOS transistor switch ($M_2$) 216". More particularly, the drain terminal of low-side nMOS transistor switch ($M_2$) 216 is connected to inductor (L) 202 of LC filter 130 at switch node (SW) pin 103 and to the source/body terminal of high-side nMOS switch transistor ($M_1$) 214. The source/body terminal of low-side nMOS transistor switch ($M_2$) 216 is connected to electrical ground 119 at ground pin (GND) 104. The drain terminal of high-side nMOS switch transistor ($M_1$) 214 is connected to input pin (IN) 101 and to input capacitor ($C_{IN}$) 142.

A first gate driver circuit (DR1) 213 is connected to drive the gate of high-side nMOS transistor switch ($M_1$) 214. A second gate driver circuit (DR2) 215 is connected to drive the gate of low-side nMOS transistor switch ($M_2$) 216. A Pulse Width Modulation (PWM) controller circuit 212 drives both first gate driver circuit (DR1) 213 and second gate driver (DR2) circuit 215. In one embodiment, first gate driver circuit (DR1) 213 has a pull-up connected to bootstrap pin (BST) 102 and a pull-down connected to switch node (SW) pin 103. In turn, PWM controller circuit 212 is driven by a first error amplifier ($A_1$) 211. The non-inverting terminal of first error amplifier ($A_1$) 211 is connected to reference pin (REF) 106 to receive a reference voltage ($V_{REF}$), the inverting terminal is connected to feedback pin (FB) 105.

Continuing with FIG. 2, active negative current modulation circuit 120 includes a first comparator circuit ($C_1$) 221 having a non-inverting terminal connected to the drain terminal, and an inverting terminal connected to the source/body terminal of low-side nMOS transistor switch ($M_2$) 216. In one embodiment, a SR flip flop circuit 222 having a set input (S) connected to the output of first comparator circuit ($C_1$) 221, a reset input (R) connected to PWM controller circuit 212 and to the input terminal of first gate driver circuit (DR1) 213. An output (Q) connected to the TRI input terminal of second gate driver circuit (DR2) 2158.

Continuing again with FIG. 2, a diode-connected n-channel Metal Oxide Semiconductor ("nMOS transistor ($M_3$) 224") is electrically coupled to a non-inverting input terminal of a second error amplifier ($A_2$) 223. That is the gate terminal of nMOS transistor ($M_3$) 224 is connected to its drain and the source/body terminal is connected to electrical ground 119. The inverting input terminal of second error amplifier ($A_2$) 223 is connected to its output terminal and to the gate of low-side nMOS transistor switch ($M_2$) 216. Second error amplifier ($A_2$) 223 functions as a buffer with unity gain that drives the gate source voltage ($V_{GS}$) of low-side transistor switch ($M_2$) 216 to be equal to that of nMOS transistor ($M_3$) 224. The output (Q) of RS flip-flop 222 is also connected to the enable terminal (EN) of second error amplifier ($A_2$) 223. Finally, a current source 225 is connected to the gate-drain connection of nMOS transistor ($M_3$) 224. Current source 215 provides a fixed current ($I_1$) to diode-connected nMOS transistor ($M_3$) 224.

If a negative current is detected causing the switch node voltage ($V_{SW}$) at switch node (SW) pin 103 to rise above electrical ground 119, first comparator circuit ($C_1$) 221 detects the change in polarities of the drain and source voltage ($V_{DS}$) of low-side nMOS transistor switch ($M_2$) 216 and goes HIGH to set SR flip flop circuit 222. In turn, a set SR flip flop circuit 222 issues a HIGH output (Q) that puts second gate driver circuit (DR2) 215 in a TRI state, or a high-impedance output state. As a result, low-side nMOS transistor ($M_2$) 216 is maintained in an on state in a linear region by second error amplifier ($A_2$) 223 so that the negative inductor current can be limited.

Figure 3A:
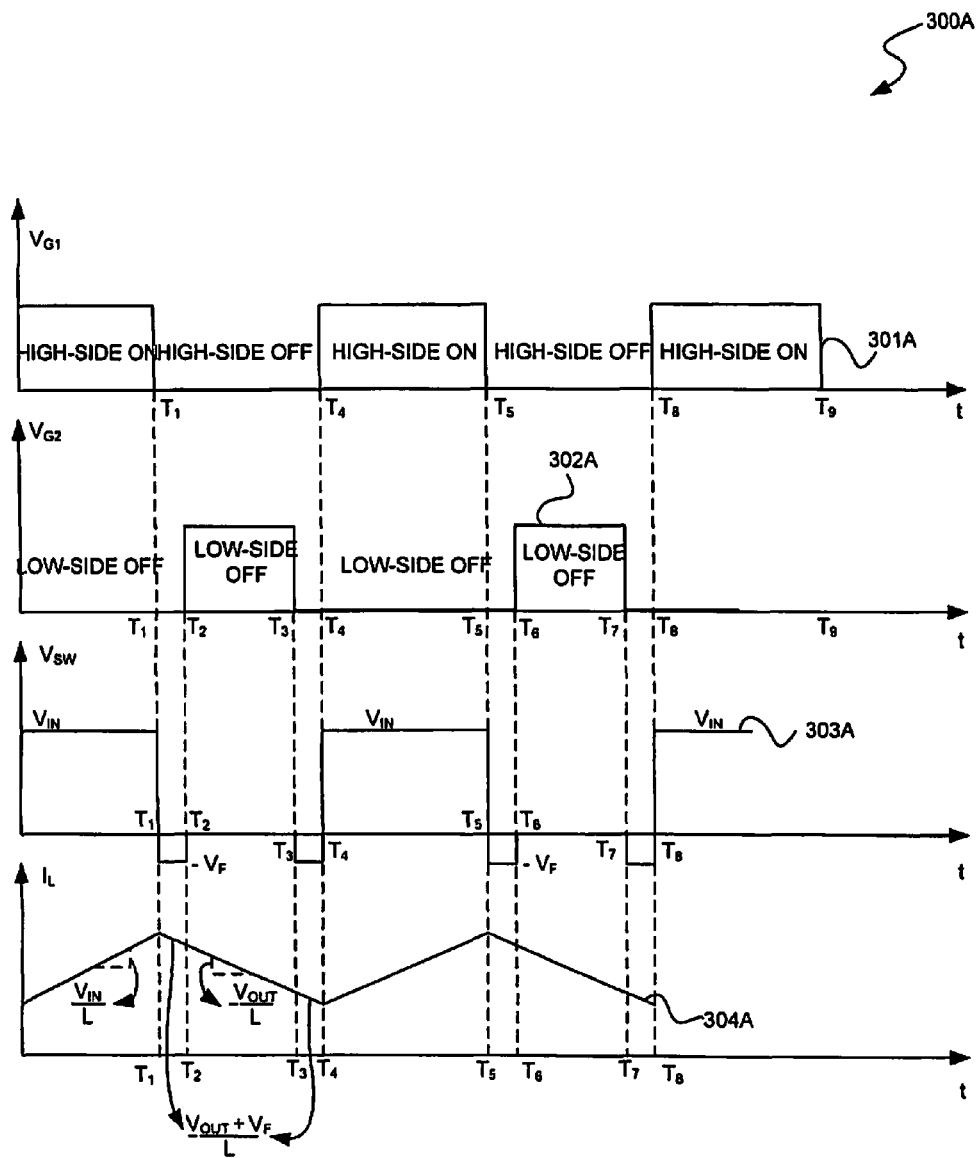
FIG. 3A illustrates voltage and current waveforms of a switch-node buck voltage regulator integrated circuit of FIG. 2 in the heavy load condition when the inductor current is positive and the active negative current modulation circuit is not activated.

The operation of switch-mode synchronous buck voltage regulator integrated circuit 200 is explained in connection with FIG. 3A and FIG. 3B as follows. Referring now to FIG. 3A, a series of waveforms 300A representing the operation of switch-mode synchronous buck voltage integrated circuit 200 in normal operation are shown. A voltage waveform 301A that represents a first gate drive voltage ($V_{G1}$) is input into the gate of high-side nMOS transistor switch ($M_1$) 214. A voltage waveform 302A that represents a second gate drive voltage ($V_{G2}$) is input into the gate of low-side nMOS transistor switch ($M_2$) 216. PWM controller circuit 212 is operative to control the on-time duration of waveform 301A and waveform 302A. Equivalently, PWM controller circuit 212 ensures that low-side transistor switch ($M_2$) 216 is turned off before high-side transistor switch ($M_1$) is turned on and vice versa. Thus, $T_1$-$T_2$, $T_3$-$T_4$, $T_5$-$T_6$, and $T_6$-$T_7$ are dead times during which both high-side nMOS transistor switch ($M_1$) 214 and low-side nMOS transistor switch ($M_2$) 216 are turned OFF regardless whether output capacitor ($C_{OUT}$) 312 is maintained at a regulated output voltage ($V_{OUT}$).

In the first switching cycle, starting from $T_0$ to $T_1$, when waveform 301A is HIGH, high-side nMOS switch transistor ($M_1$) 214 is turned ON. At the same time, waveform 302A is LOW, low-side nMOS switch transistor ($M_2$) 216 is turned OFF. As a result, switch node (SW) pin 103 is connected to unregulated input voltage ($V_{IN}$). This is illustrated by a waveform 303A representing the switch node voltage ($V_{SW}$) at switch node (SW) pin 103. During this time period, the inductor current ($I_L$) represented by a waveform 304A which increases at a slope of:

$$\frac{dI_L}{dt} = \frac{V_{IN}}{L}.$$

Next, during the first dead time period, from $T_1$ to $T_2$, when both high-side nMOS transistor switch ($M_1$) 214 and low-side nMOS transistor switch ($M_2$) 216 are OFF, the voltage at switch node (SW) pin 103 is now isolated from unregulated input voltage ($V_{IN}$). During dead time $T_1$ to $T_2$, inductor (L) 131 produces free wheeling current that flows through and turns on the integral body diode (not shown) of low-side nMOS transistor switch ($M_2$) 216. As a result, the voltage of switch node (SW) 103 is $-V_F$. Equivalently, from $T_1$ to $T_2$, $V_{SW}=-V_F$, which is shown in waveform 303A. The inductor current ($I_L$) in inductor (L) 131 decreases during this period, which is shown in waveform 304A. Thus, the slope of waveform 304A representing the inductor current from $T_1$ to $T_2$ is:

$$\frac{dI_L}{dt} = -\frac{V_{OUT} + V_F}{L}.$$

From $T_2$ to $T_3$, second gate drive voltage ($V_{G2}$) is HIGH. Thus, low-side nMOS transistor switch ($M_2$) 216 is turned ON. Consequently, switch node (SW) pin 103 is now connected to electrical ground 119, and waveform 303A is now increasing from $-V_F$ to zero voltage. As such, the slope of waveform 304A representing the inductor current ($I_L$) from $T_2$ to $T_3$ is:

$$\frac{dI_L}{dt} = -\frac{V_{OUT}}{L}.$$

From, $T_3$ to $T_4$, switch-mode synchronous buck voltage regulator integrated circuit 200 enters a second dead time. Accordingly, high-side nMOS transistor switch ($M_1$) 214 and low-side nMOS transistor switch ($M_2$) 216 are both OFF. During this period, the inductor current ($I_L$) continues to flow to output terminal 134 via the body diode of low-side nMOS transistor switch ($M_2$) 216. As such, waveform 303A drops to $-V_F$. Thus, the slope of waveform 204A representing the inductor current ($I_L$) is:

$$\frac{dI_L}{dt} = -\frac{V_{OUT} + V_F}{L}.$$

After $T_4$, waveforms 300A repeat in the following switching cycles as shown in FIG. 3A.

In summary, during the heavy load condition, because inductor current ($I_L$) is positive and flowing from switch node (SW) pin 103 to output terminal 134, comparator circuit ($C_1$) 221 issues a LOW output signal at the input terminal S of SR flip flop 222. Accordingly, SR flip flop circuit 222 is not set and its output (Q) is LOW, which does not enable second error amplifier ($A_2$) 223 and does not cause second gate driver circuit (DR2) to be in a tri-state or a high impedance output state. Thus, buck voltage regulator circuit 110 controls the operation of switch-mode buck voltage regulator integrated circuit 200.

Figure 3B:
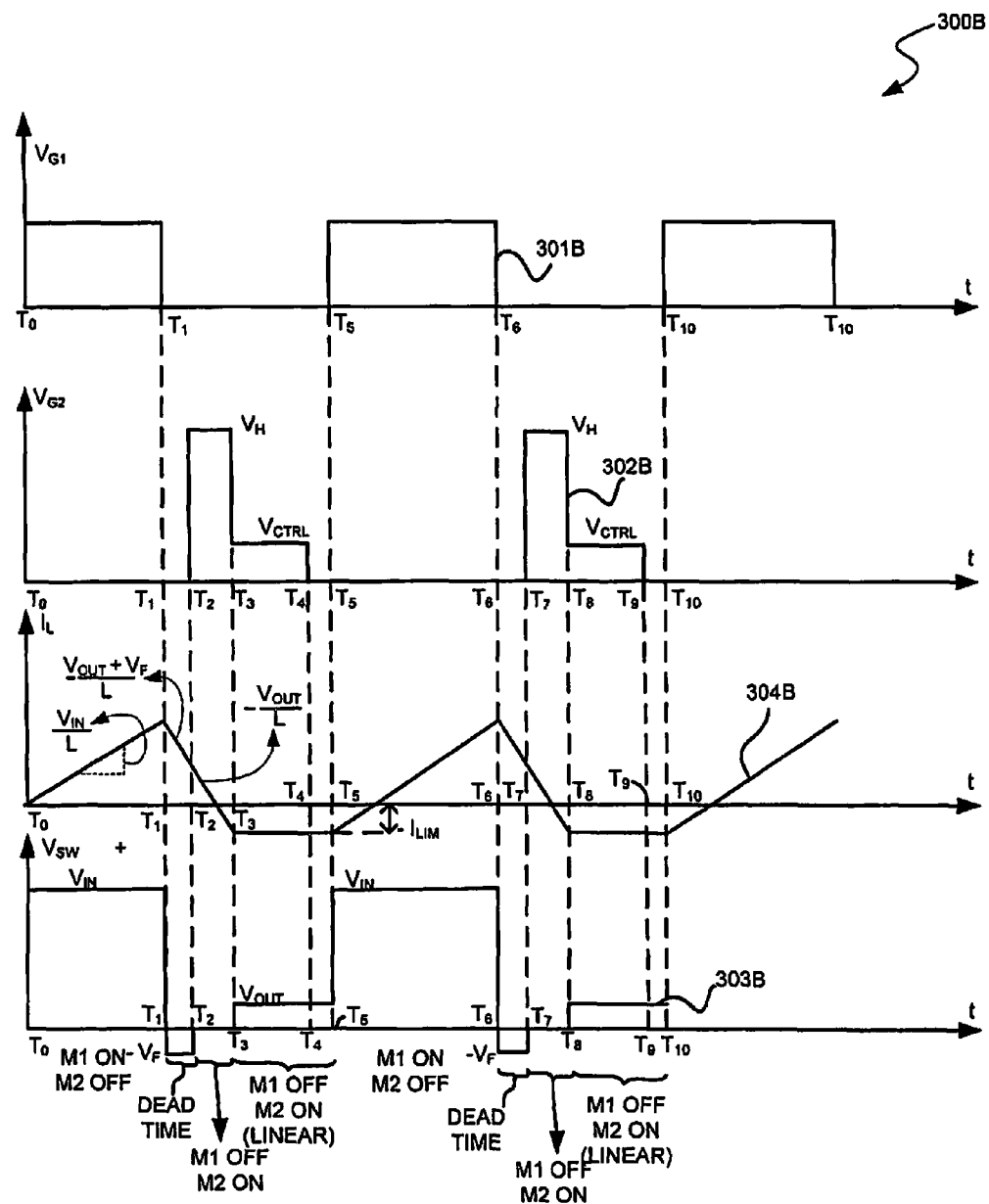
FIG. 3B illustrates voltage and current waveforms of the switch-mode buck voltage regulator integrated circuit of FIG. 2 in a light load condition when the inductor current becomes negative and the active negative current modulation circuit is activated.

Now referring to FIG. 3B, FIG. 3B illustrates the operation of switch-mode synchronous buck voltage regulator integrated circuit 200 during light load and when active negative current modulation circuit 120 is activated to limit the negative inductor current ($I_L$). During operation under the light load, high-side nMOS transistor switch ($M_1$) 214 and low-side nMOS transistor switch ($M_2$) 216 continue to be toggled ON and OFF alternately. This is represented by a waveform 301B that represents first gate drive voltage ($V_{G1}$) and by a waveform 302B representing second gate drive voltage ($V_{G2}$). In this context, waveform 302B representing second gate drive voltage ($V_{G2}$) is different from waveform 302A of FIG. 3A because second gate drive voltage ($V_{G2}$) is now modulated by active negative current modulation circuit 120.

In the first switching cycle, from $T_0$ to $T_1$, the first gate drive voltage ($V_{G1}$) is HIGH and second gate drive voltage ($V_{G2}$) is LOW. Referring back to FIG. 2, high-side nMOS switch ($M_1$) 214 is ON, connecting switch node (SW) pin 103 to input pin (IN) 101. Thus, the switch node voltage ($V_{SW}$) is the input voltage ($V_{IN}$), or $V_{SW}=V_{IN}$. This is shown in a waveform 303B. A waveform 304B representing inductor current ($I_L$) has a slope of $$\frac{dI_L}{dt} = \frac{V_{IN}}{L}.$$

From $T_1$ to $T_2$, switch-mode synchronous buck voltage regulator integrated circuit 200 enters a dead time to avoid shoot-through problem. Both high-side nMOS transistor switch ($M_1$) 214 and low-side pMOS transistor switch ($M_2$) 216 are OFF. However, the integral body diode (not shown) of low-side nMOS transistor switch ($M_2$) 216 is turned ON because the freewheeling current in inductor (L) 131 starts to decrease when high-side nMOS transistor switch ($M_1$) 214 is turned OFF. Thus, the switch voltage ($V_{SW}$) at switch node (SW) pin 103 decreases to the negative of a forward drop ($V_F$) of the body diode. Thus, $V_{SW}=-V_F$. Accordingly, inductor current ($I_L$) decreases as shown in waveform 304B. Thus, the slope of waveform 304B representing the inductor current ($I_L$) is:

$$\frac{dI_L}{dt} = -\frac{V_{OUT} + V_F}{L}.$$

Next, from $T_2$ to $T_3$, when first drive voltage ($V_{G1}$) is LOW and second gate drive voltage ($V_{G2}$) is HIGH, high-side nMOS switch ($M_1$) 214 is OFF and low-side nMOS transistor switch ($M_2$) 216 is ON. Switch node (SW) pin 103 is connected to ground pin (GND) 104 and equal to 0. Thus, switch node voltage ($V_{SW}$) increases from $-V_F$ to 0 as shown in waveform 303B. In the mean time, inductor current ($I_L$) continues to decrease at a slope of $$\frac{dI_L}{dt} = -\frac{V_{OUT}}{L}$$

until it crosses the zero line and becoming negative. At that moment, comparator circuit ($C_1$) 221 detects the change in polarities of the voltage between the drain terminal and the source/body terminal of low-side nMOS transistor switch ($M_2$) 216 and issues a HIGH output signal to set input (S) of SR flip flop 222. This sets SR flip flop 222 and thus output (Q) is HIGH. Second gate drive circuit (DR2) 215 is switched to a tri-state, or a high impedance output state, which lowers the second gate drive voltage ($V_{G2}$) to a control voltage ($V_{CTRL}$) Accordingly, second error amplifier circuit ($A_2$) 223 is now enabled to regulate control voltage ($V_{CTRL}$) that limits negative inductor current ($I_L$) to a preset value set by current source 225, which is $I_1$. As a result of this current regulation by second error amplifier circuit ($A_2$) 223, second gate drive voltage ($V_{G2}$) decreases to control voltage ($V_{CTRL}$) that is less than the original HIGH level ($V_H$) as shown in waveform 302B. In one embodiment, the size of low-side nMOS transistor switch ($M_2$) 216 is n times larger than that of nMOS transistor ($M_3$) 224. Thus, the current flowing across low-side nMOS transistor switch ($M_2$) 216 is also n times larger than that flowing through nMOS transistor ($M_3$) 224. Thus, the current $I_{LIM}$ that flowing through low-side nMOS transistor switch ($M_2$) 216 is: $I_{LIM}=-(n \times I_1)$, where $I_1$ is the current that flows through nMOS transistor ($M_3$) 224. This is shown in the plateau region starting from $T_3$ in waveform 303B.

From $T_3$ to $T_4$, as long as inductor current ($I_L$) is negative, low-side nMOS transistor switch ($M_2$) 216 continues to stay ON and driven in the linear mode with a control current equal to $I_{LIM}=-(n \times I_1)$.

From $T_4$ to $T_5$, during the next dead time period, both high-side nMOS transistor switch ($M_1$) 214 and low-side nMOS transistor switch ($M_2$) 216 are OFF respectively. Thus, switch node (SW) pin 103 is floating around output voltage ($V_{OUT}$) as shown in waveform 303B.

From $T_5$ to $T_6$, high-side nMOS transistor switch ($M_1$) 214 is turned on again. PWM controller circuit 212 resets SR flip flop circuit 222. As such, the output Q of SR flip flop circuit 222 goes LOW, releasing second gate driver circuit (DR2) 215 from its tri-state and disabling second error amplifier ($A_2$) 223. As a consequence, second error amplifier ($A_2$) 223 ceases to control the gate of low-side nMOS transistor ($M_2$) 216. A corollary of this is that active negative current modulation circuit 120 releases the control of switch-mode synchronous buck integrated circuit 200 and buck voltage regulator circuit 110 takes over.

In the next switching cycles, from $T_6$ on, waveforms 300B repeat as shown in FIG. 3B.

Figure 4:
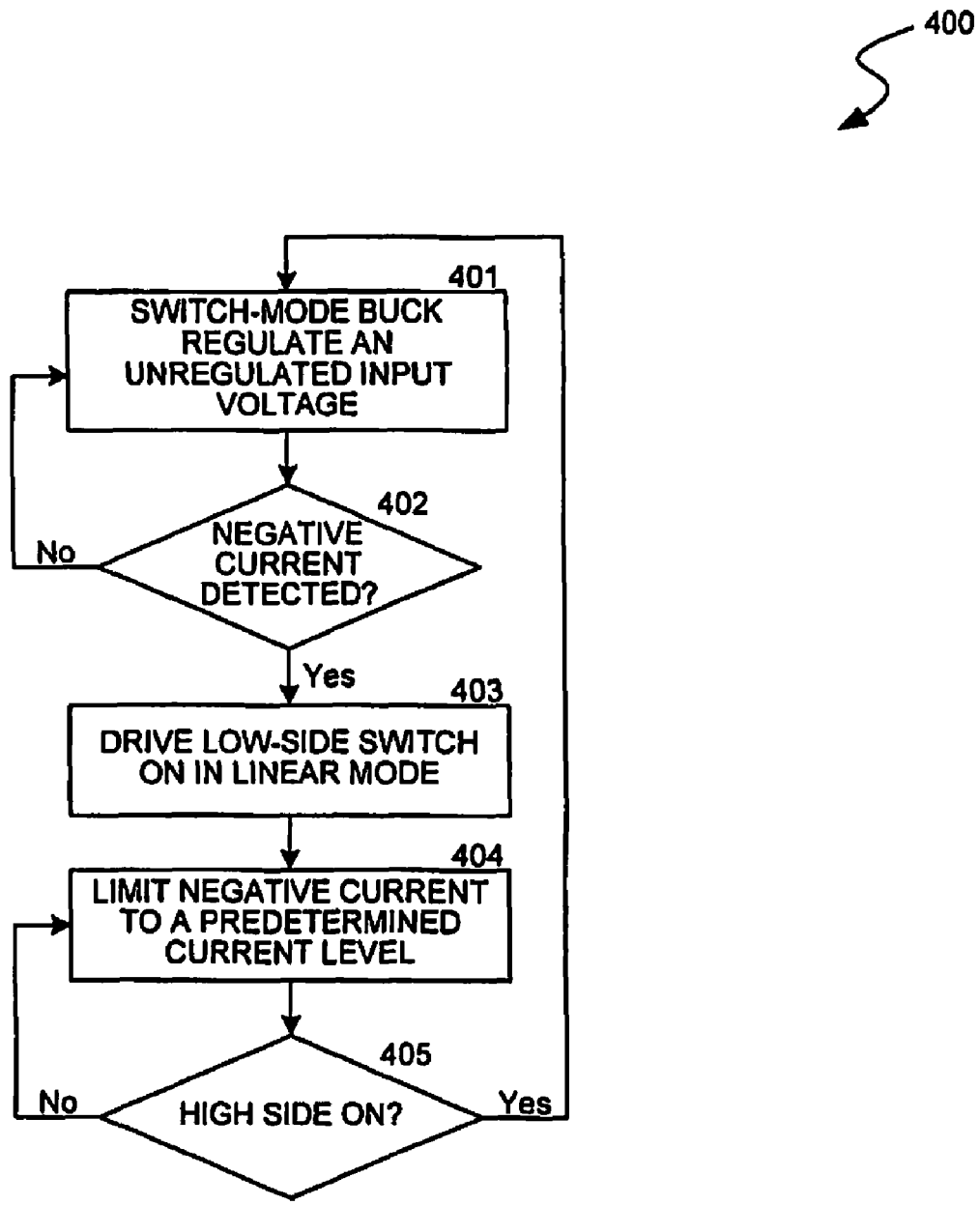
FIG. 4 is a flow chart of a method of controlling a switch-mode buck voltage regulator integrated circuit (IC) in accordance with an embodiment of the present invention.

Now referring to FIG. 4, a flow chart 400 illustrating a method of controlling a negative current in a synchronous buck regulator circuit that includes the steps of: regulating an unregulated input voltage, detecting for negative current, when negative current is detected, causing the low-side switch to be ON and to operate in the linear mode, and limiting the negative current to a predetermined current level. If the negative current is not detected, continue to operate the buck voltage regulator in a usual manner. Finally, the method also includes a step of determining whether the high-side switch is turned ON again. If the high-side switch is turned on, regulating the input voltage as normal. Otherwise, continue to hold the inductor current at the predetermined current level.

Now referring to step 401, an input voltage is regulated. An unregulated input voltage ($V_{IN}$) is received and regulated to generate an output voltage. In one embodiment, a switch-mode buck voltage regulation is used. In the present invention, step 401 is implemented by buck voltage regulator circuit 110 that receives an input voltage ($V_{IN}$) at input pin (IN) 101 and generates a regulated output voltage ($V_{OUT}$) at output terminal 134. More particularly, step 401 is implemented using a high-side nMOS transistor switch ($M_1$) 214 driven by first gate driver circuit (DR1) 213, a low-side nMOS transistor switch ($M_2$) 216 driven by a second gate driver circuit (DR2) 216. Both first gate driver circuit (DR1) 213 and second gate driver circuit (DR2) 216 are controlled by PWM controller circuit 212 and a comparator circuit ($C_1$) 221.

Referring next to step 402, a negative current is monitored. Inductor current ($I_L$) is constantly monitored during light mode operation in which the inductor current ($I_L$) crosses the zero line and becomes negative. As this happens, switch node voltage ($V_{SW}$) changes polarities. Step 402 is implemented by negative current modulation circuit 120. More particularly, step 402 is implemented by comparator circuit ($C_1$) 221 coupled across low-side nMOS transistor switch ($M_2$) 216.

Referring to step 403, the low-side switch is driven in linear mode if a negative current is detected. Step 403 further includes causing the gate driver circuit of the low-side switch to be in a tri-state or high-impedance state. This step is implemented by comparator circuit ($C_1$) 221 and SR flip flop circuit 222. The setting of SR flip flop 222 enables second error amplifier ($A_2$) 223 and causes second gate driver circuit (DR2) 215 to be in a high impedance output state.

Following step 403 is step 404, where the inductor current ($I_L$) is limited to a predetermined current level. Step 404 is implemented by active negative current modulation circuit 120 shown in FIG. 1 and FIG. 2. The operation of active negative current modulation circuit 120 in implementing step 403 is described above.

Finally, referring to step 405, it is determined whether the high-side switch is turned on in the next switching cycle. Whenever the high-side switch is turned back ON in the next switching cycle, normal regulation is returned, i.e., the negative inductor current is not controlled anymore. If the high-side switch is not turned back on, the negative current is continued to be limited. Step 405 is implemented by active negative current modulation circuit 120 as described above in FIG. 2, FIG. 3A, and FIG. 3B.

Many modifications and variations of the present invention are possible in light of the above teachings. It is therefore to be understood that within the scope of the appended claims the invention may be practiced otherwise than as specifically described. It should be understood, of course, the foregoing disclosure relates only to a some embodiments of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

I claim:

1. A circuit comprising:
   a buck voltage regulator including a low-side switch and a high-side switch, the buck voltage regulator operable to generate a stabilized output voltage which is less than an input voltage; and
   an active current modulator electrically coupled to detect a negative current flowing through said low-side switch, wherein when said negative current is detected, said active current modulator is activated to cause said low-side switch to be turned on in a linear mode, and to limit said negative current to a predetermined current level.

2. The circuit of claim 1 wherein said active negative current modulator terminates driving said low-side switch in said linear mode and limiting said negative current to said predetermined current level when said high-side switch is turned on in the next switching cycle during a light mode condition.

3. The circuit of claim 1 further comprising an LC filter circuit electrically coupled to said buck voltage regulator circuit, said LC filter circuit operable to generate said stabilized output voltage upon receiving a switched signal generated by the switching on and off of said high-side switch and said low-side switch.

4. The circuit of claim 1 wherein:
   said high-side switch is at least an n-type Metal Oxide Semiconductor (nMOS) transistor switch; and
   said low-side switch is at least an n-type Metal Oxide Semiconductor (nMOS) transistor switch electrically coupled in series to said high-side nMOS transistor switch.

5. The circuit of claim 4 wherein said buck voltage regulator further comprises:
   a first gate driver circuit electrically coupled to drive said high-side nMOS transistor switch; and
   a second gate driver circuit electrically coupled to drive said low-side nMOS transistor switch.

6. The circuit of claim 5 wherein said active negative current modulator causes said second gate driver circuit to be in a high impedance output state during a light mode condition when said negative current is detected.

7. The circuit of claim 6 wherein said buck voltage regulator circuit further comprises:
a Pulse Width Modulation (PWM) controller circuit electrically coupled to drive said first gate driver circuit and said second gate driver circuit; and
a first error amplifier electrically coupled to a first reference voltage and a feedback signal from said stabilized output voltage.

8. The of claim 1 wherein said active current modulator further comprises:
a comparator electrically coupled to said low-side switch operable to detect said negative current; and
a current mirror electrically coupled to said comparator circuit and to said buck voltage regulator, the current mirror operable to force said negative current to be equal to said predetermined current level.

9. The circuit of claim 8 wherein said current mirror further comprises:
a n-channel Metal Oxide Semiconductor (nMOS) transistor connected as a diode;
a current source that generates a current proportional to said predetermined current level; and
a buffer circuit, the non-inverting input terminal of said buffer circuit electrically coupled to said current source and to the gate terminal and the drain terminal of said nMOS transistor, the inverting input terminal electrically coupled to its output terminal and to the gate of said low-side nMOS transistor switch.

10. The circuit of claim 8 wherein said comparator circuit further comprises a non-inverting input terminal, an inverting input terminal, and an output terminal, the inverting input terminal electrically coupled to the source/body of said low-side nMOS transistor switch, the non-inverting input terminal electrically coupled to the drain of said low-side nMOS transistor switch.

11. The circuit of claim 10 wherein said nMOS transistor is substantially smaller in size than said low-side nMOS transistor switch.

12. The circuit of claim 8 wherein said active current modulator further comprises an SR flip flop circuit electrically coupled to said second gate driver circuit and said buffer circuit.

13. The circuit of claim 1 wherein said buck voltage regulator further comprises a bootstrap circuit operable to pass correct switching voltages to said low-side switch and said high-side switch.

14. A method of controlling a switch-mode buck voltage regulator circuit having a high-side switch and a low-side switch, comprising:
detecting whether a current flowing through said low-side switch has changed direction to become a negative current during a light load condition; and
whenever said negative current is detected, causing said low-side switch to be turned ON in a linear mode; and
limiting said negative current to a predetermined current level.

15. The method of claim 14 further comprising generating a stabilized output voltage that is smaller than an input voltage.

16. The method of claim 14 wherein detecting whether a current flowing through said low-side switch has changed direction includes determining whether a voltage at a switch node has changed polarities.

17. The method of claim 14 wherein causing said low-side switch to be ON in a linear mode includes monitoring a feedback voltage of said switch-mode buck voltage regulator circuit.

18. The method of claim 14 wherein driving said low-side switch to be ON in a linear mode includes causing a driver circuit of said low-side switch to be driven in a high-impedance output state.

19. The method of claim 14 wherein said forcing said negative current to be equal to a predetermined current level further comprises:
generating a reference current that is proportional to said predetermined current level; and
causing said negative current to be equal to said predetermined current level.

20. The method of claim 14 further comprising terminating driving said low-side switch in said linear state and terminating setting said negative current to said predetermined current level when said high-side switch is turned on again.

* * * * *